United States Patent

[11] 3,579,096

| | | | | |
|---|---|---|---|---|
| [72] | Inventor | Edward E. Buchanan, Jr.<br>Dallas, Tex. | [56] | References Cited |
| [21] | Appl. No. | 821,003 | | UNITED STATES PATENTS |
| [22] | Filed | May 1, 1969 | 3,319,152  5/1967  Pinckaers.................... 323/22(ZS) |
| [45] | Patented | May 18, 1971 | 3,340,460  9/1967  Clarke et al. ................. 323/22(ZS) |
| [73] | Assignee | Electronic Control Corporation<br>Euless, Tex. | 3,365,654  1/1968  Johnston...................... 323/22(ZS) |

*Primary Examiner*—Gerald Goldberg
*Attorney*—Giles C. Clegg, Jr.

[54] PROPORTIONAL POWER CONTROL CIRCUIT
19 Claims, 2 Drawing Figs.

[52] U.S. Cl................................................. 323/22SC,
307/133, 323/24, 323/36, 323/39
[51] Int. Cl................................................. G05f 1/40
[50] Field of Search......................................... 323/(Termatrex), 4, 9, 18—22, 24, 22 (ZS), 22 (T,SCR), 32, 36, 38, 39; 307/133

ABSTRACT: A proportional power control circuit in which the average power applied to the load is controlled by controlling the number of cycles of power applied to a load in a series of available cycles of power. A proportional gate is generated for controlling the application of power to the load. The proportional gate is generated by a circuit which compares a reference voltage that varies in accordance with the demand for power with a ramp voltage whose potential varies as a function of time.

Patented May 18, 1971

INVENTOR
EDWARD E. BUCHANAN

ATTORNEY

INVENTOR
EDWARD E. BUCHANAN

PROPORTIONAL POWER CONTROL CIRCUIT

BACKGROUND OF THE INVENTION

The present invention relates to power control circuitry and more particularly to a proportional power control circuit in which the average power applied to the load is controlled by controlling the number of cycles of supply voltage supplied to the load in a discrete period of time.

The use of thyristors, such as the gas thyristors, silicon controlled rectifier (SCR) and the newer bilateral semiconductor switch, for control of power has been known for some time. However, in general, such power control systems have utilized the so-called "phase control" method in which the average power applied to the load is controlled by varying the percentage of a particular half-cycle of supply voltage in which current is permitted to flow to the load. Such power control circuits have been very successful. However, they are characterized by the disadvantage that the switching of the power device generates a substantial amount of radiofrequency interference. The problem of radiofrequency interference increases as the power being switched increases. Accordingly, efforts have been made to alleviate this problem when the character of the load permits by controlling the proportional number of complete cycles of power supplied to the load during a period of time rather than the proportionate part of particular half-cycles of power. Most controls which attempt to control the number of complete cycles applied to the load use magnetic amplifiers or other such saturable devices.

SUMMARY OF THE INVENTION

The present invention provides a power control for controlling the average power applied to the load by varying the number of cycles of power applied to the load and which requires the use of only solid-state devices, conventional resistors and capacitors. The circuit of the present invention provides zero crossing switching control of high power loads, eliminating the necessity for use of radiofrequency suppression networks.

The power control circuit of the present invention can be used for controlling loads of many different types. However, it is especially useful in controlling the current supplies to heaters.

In accordance with the present invention, there is provided means for generating a ramp voltage having a period substantially equal to that of the desired number of cycles of the alternating current supply voltage. A reference voltage whose potential varies in accordance with the amount of power to be supplied to a load is also generated. A proportional control signal is generated whose character is determined by comparison of the reference voltage to the instantaneous ramp voltage. The proportional control signal controls the conductivity state of the power device connected to control the load. The power device is turned on only at the beginning of one half-cycle of the supply voltage and, preferably, is maintained conductive through the other half-cycle.

DESCRIPTION OF THE DRAWINGS

Many objects and advantages of the invention will become apparent to those skilled in the art as a detailed description of a preferred embodiment of the invention unfolds in conjunction with the appended drawings in which.

Figure 1:
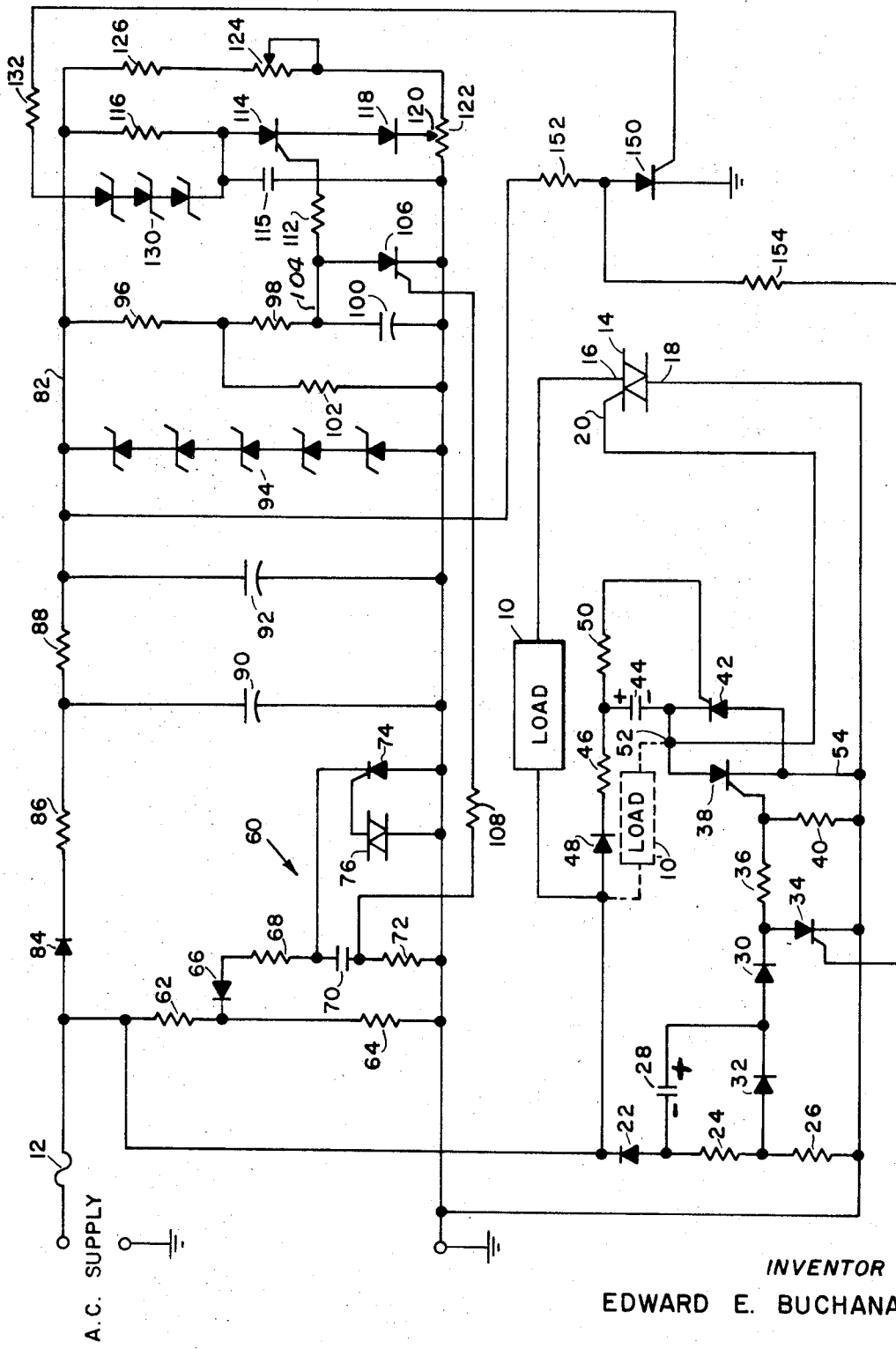
FIG. 1 is a schematic diagram of a preferred embodiment of the invention.

Referring now to the drawings, there is shown a load 10 connected in series with a fuse 12 and a bilateral semiconductor switching device 14. As such, the device includes a pair of power terminals 16 and 18. The device normally exhibits very high impedance between the two power terminals. However, when a control signal is applied to a gate electrode 20, the device switches to a quasistable low-impedance state and remains in the low-impedance state so long as a minimal amount of current referred to as holding current flows through the power electrodes. The device 14 is symmetrical in its switching action and, accordingly, is capable of controlling full-wave alternating current power.

In accordance with the preferred embodiment of the invention, there is provided means for producing a control signal and applying the control signal to the gate electrode 20 of the device 14 to render the device conductive at the beginning of selected ones of the positive half-cycle of the applied alternating current supply voltage. The control signal generating means is especially adapted so that if a control signal is applied to the device 14 during a positive half-cycle, it will also be applied to the device during the negative half-cycle. The control signal generating means continuously applies a control signal to the device 14 unless disabled.

The control signal generating means includes a diode 22 whose cathode is connected to line voltage and whose anode is connected through resistors 24 and 26 to ground, or a point of common potential. The anode of diode 22 is also connected through a capacitor 28 to the anode of a diode 30 and to the cathode of a diode 32. The anode of diode 32 is connected to the juncture between resistors 24 and 26. The cathode of diode 30 is connected to the anode of a silicon control rectifier (SCR) 34 and through resistor 36 to a gate electrode of a SCR 38. The gate electrode of SCR 38 is connected by resistor 40 to ground. The cathodes of the silicon control rectifiers 34 and 38 are each connected to ground. The anode of SCR 38 is connected to the cathode of SCR 42 and to the gate electrode 20 of the device 14. The anode of SCR 42 is connected to ground and its cathode is connected through capacitor 44 and resistor 46 to the cathode of a diode 48 whose anode is connected to line potential. A resistor 50 is connected from the juncture of capacitor 44 and resistor 46 to the gate of SCR 42.

During the negative half-cycle of a cycle of alternating supply current voltage, the capacitor 28 will be charged with the polarity shown as the result of flow of current through the diode 22, the capacitor 28, the diode 32, and the resistor 26. The charge on the capacitor 28 will be the maximum instantaneous voltage developed across the resistor 24 which comprises a voltage divider in combination with the resistor 26. After the peak of the negative half-cycle, the diodes 22 and 32 will be biased to a nonconductive state due to the voltage to which capacitor 28 is charged. As the line voltage increases positively from the maximum negative level, positive gate drive will be applied to SCR 38 when the instantaneous line voltage is approximately equal to the charge on capacitor 28. As the line voltage becomes less negative, the gate current flowing will increase as a result of discharge of the capacitor 28 providing assurance of adequate gate current applied to the gate of SCR 38 before and after the beginning of the positive half-cycle of the line voltage. The SCR 38 will, therefore, switch to the low-impedance state almost immediately upon the line voltage entering a positive half-cycle and gate current will be supplied to the device 38 throughout the positive half-cycle of the applied line voltage. At the end of the positive half-cycle, the device 38 will return to its high-impedance state. During the negative half-cycle, the capacitor 28 will again be charged. It will be noted that during the time that device 38 is conductive and during the positive half-cycle, the capacitor 44 will be charged with the polarity shown. The charge path will be through diode 48, resistor 46, capacitor 44 and the power electrodes of SCR 38. During the negative half-cycle immediately following a positive half-cycle in which the device 38 is rendered conductive, the capacitor 44 will discharge through the resistor 50 providing gate current to the SCR 42 immediately prior to commencement of the negative half-cycle and during the entire negative half-cycle. It will be noted that the two SCR's 38 and 42 are functionally similar to the single device 14. Accordingly, the load 10 could be connected in series with silicon controlled rectifiers 38 and 42, the lead 52 and the lead 54, as indicated in phantom, thus enabling elimination of the device 14 from the circuit.

From the foregoing, it can be seen that as long as the SCR 34 remains nonconductive the device 14 will be switched to its low-impedance state at the beginning of each half-cycle of alternating current supply voltage and will be maintained in the low-impedance state until the end of each half-cycle.

If SCR 34 is switched to the low-impedance state during the positive half-cycle of a cycle of alternating current supply voltage, the diode 30 will be shunted to ground permitting discharge of the capacitor 28. However, SCR 38 will remain in the low-impedance state as the load current flowing will be sufficient to provide the necessary holding current for the device. Discharge of the capacitor 28 will not affect the slave control of SCR 42 and, accordingly, power will be applied to the load for the immediately succeeding negative half-cycle. When the next positive half-cycle occurs, the capacitor 28 will not be charged. Accordingly, SCR 38 will not be biased on during the positive half-cycle and SCR 42 will not be biased on during the negative half-cycle. Power will not be applied to the load until SCR 34 returns to its high-impedance state.

It is important to note that when the control signal is removed from the gate of SCR 34, it will switch to its high-impedance state because the potential appearing at its anode will not be sufficient to provide holding current. If SCR 34 returns to its high-impedance state during a positive half-cycle, SCR 38 will not be switched to its low-impedance state until the beginning of the next positive half-cycle, as it is necessary that capacitor 28 be charged during a negative half-cycle before the SCR 38 can be turned on. If the SCR 34 is turned off during the negative half-cycle, conduction will begin at the beginning of the next positive half-cycle only if SCR 34 is turned off early enough in the negative half-cycle to permit the capacitor 28 to charge to a level sufficient to bias the SCR 38 on. It can, therefore, be seen that the circuit described above applies full-wave power to the control when the SCR is in the high-impedance state and no power is applied to load when SCR 34 is in the low-impedance state. Moreover, assurance is provided that conduction of the power device in any half-cycle will commence near the zero crossing point at the beginning of the half-cycle and continue to the end of the half-cycle, essentially eliminating generation of radiofrequency interference.

In accordance with the preferred embodiment of the invention, there is also provided circuitry for generating a ramp voltage and applying a control signal to SCR 34 when the potential of the ramp voltage is above a reference voltage level. The reference voltage level is variable in accordance with the amount of power required. Thus, if no power is required, the predetermined level can be made essentially zero in which event SCR 34 will be maintained conductive essentially during all periods of time. If, on the other hand, the reference voltage level is substantially equal to the maximum potential of the ramp voltage, SCR 34 will be maintained off essentially all the time and full power will be applied to the load. The period of the ramp voltage signal is made substantially equal to the period of a plurality of cycles of the applied alternating supply current voltage. It is preferred that the period of the ramp voltage be equal to that of approximately 50 cycles of supply voltage although this is not necessary and its period could be approximately equal to that of a smaller or greater number of cycles of supply voltage.

The circuit for generating the ramp voltage of the character described above preferably includes a relaxation oscillator designated generally by the reference character 60. In accordance with the preferred embodiment of the invention, the relaxation oscillator includes a voltage divider network comprising resistors 62 and 64 connected across the line voltage to ground. The juncture between the resistors 62 and 64 is connected to the cathode of a diode 66 whose anode is connected to ground through a series-connected resistor 68, capacitor 70 and resistor 72. The juncture between resistor 68 and capacitor 70 is connected to the cathode of a silicon control rectifier 74 whose anode is connected to ground. The gate of SCR 74 is connected to ground through an avalanche diode device 76.

When the charge on the capacitor becomes in excess of the break over voltage of the diode device 76, gate current will be applied to switch it to the low-impedance state permitting rapid discharge of capacitor 70. A positive going pulse will be produced across the resistor 72 as the capacitor discharges. The resistance of resistor 72 is preferably small in order that the capacitor will discharge quite rapidly providing a pulse of very narrow duration, suitably in the order of 100 micro seconds. The pulse is as shown by curve B of FIG. 2, and is designated by the reference character 80. The applied alternating supply current voltage is shown in curve C of FIG. 2. It will be noted that the pulse 80 will generally be produced during the negative half-cycle of the alternating current supply voltage at a point of maximum instantaneous amplitude.

The line voltage is rectified and filtered to provide on line 82 a DC constant voltage level, suitably in the order of 20 to 100 volts. Thus, the source of supply voltage is connected to line 82 through a diode 84, a power resistor 86, and a power resistor 88. The juncture between resistors 86 and 88 is connected to ground through a filtering capacitor 90. Line 82 is similarly connected to ground through a filtering capacitor 92. Series connected Zener diodes 94 are connected in shunt with the capacitor 92 for regulating the potential appearing on line 82.

The line 82 is connected to ground through series-connected resistor 96, resistor 98 and a capacitor 100. The juncture between resistors 96 and 98 is connected to ground through resistor 102. The juncture between resistor 98 and a capacitor 100 is connected to line 104 which is, in turn, connected to the anode of a SCR 106. The cathode of SCR 106 is connected to ground and its gate is connected through a resistor 108 to the juncture between previously described capacitor 70 and resistor 72. It is important to note that the resistance in the load circuit of SCR 106 is sufficiently high that SCR 106 will be operated in a sublatching mode. Accordingly, SCR 106 will only be in low-impedance state when a gate signal is applied thereto. Accordingly, the SCR 106 will be in the low-impedance state only when the pulse 80 is present.

Figure 2:
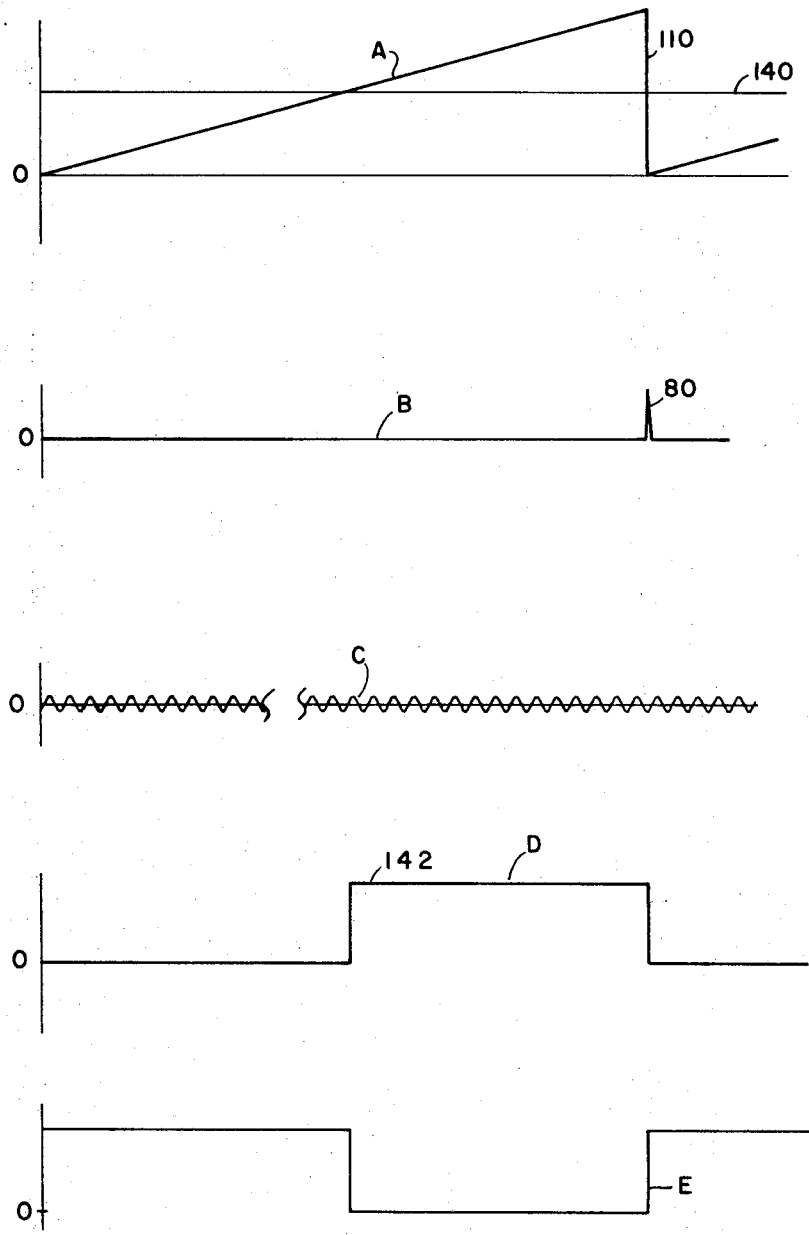
FIG. 2 shows curves illustrating the wave forms appearing in the circuitry of FIG. 1.

The charge on capacitor 100 will increase as shown in curve A of FIG. 2, providing a ramp voltage signal 110. Preferably, the resistance of the charging path for capacitor 100 established by resistor 98 is sufficiently high that the capacitor will be charging at a substantially linear rate when the pulse 80 occurs, causing ramp voltage curve 110 to have a substantially linear slope. Resistors 96 and 102 form a voltage divider reducing the potential applied for charging capacitor 100. There is thereby provided a ramp voltage signal having a period equal to the number of cycles of supply voltage required to charge capacitor 70 until pulse 80 is produced. When pulse 80 is produced, SCR 106 will momentarily be biased to the low-impedance state permitting capacitor 100 to discharge to near zero potential almost instantaneously. At the end of pulse 80, SCR 106 will return to the high-impedance state and the capacitor 100 will commence to charge again.

The line 104 is connected through a resistor 112 to the gate electrode of still another SCR 114. The anode of SCR 114 is connected through a resistor 116 to line 82. It will be noted that the resistance of resistor 116 is sufficiently high that the SCR 114 is also operated in the sublatching mode. The cathode of SCR 114 is connected through a decoupling diode 118 to a tap 120 of a potentiometer 122. One side of the potentiometer is connected to ground and its other side is connected through a variable resistor 124 and a fixed resistor 126 to line 82. The potential appearing at the cathode of SCR 114 will be determined by the setting of tap 120 of potentiometer 122. Thus, SCR 114 will be nonconductive until the ramp voltage becomes slightly in excess of the reference voltage appearing at tap 120. The position of tap 120 is controlled in accordance with the power requirements of the load by suitable means, not shown, such as, for example, a bellows. The anode of SCR 114 is connected through Zener diodes 130 and resistor 132 to the gate of SCR 150. The Zener diodes 130 provide DC restoration. The anode of SCR 150 is connected through resistor 152 to line 82 and its cathode is connected to the point of common potential. The anode of SCR 150 is connected through resistor 154 to the gate of SCR 34. The signal applied to the gate of SCR 34 will be shown in curve D of FIG. 2. The proportional control signal is essentially binary in character and will not be applied to SCR 134 until the potential of ramp voltage signal 110, as shown in curve A of FIG. 2, exceeds a reference voltage level 140 established by the setting of potentiometer 122. Upon the potential of the ramp voltage exceeding the reference voltage level 140, a proportional control signal 142 will change level as shown in curve D of FIG. 2, causing SCR 134 to switch to the low-impedance state until the ramp voltage signal terminates upon occurrence of the pulse 80. Thus, a desired proportion of complete cycles of supply voltage is controllably applied to load 10 in accordance with the setting of potentiometer 122. It is important to note that if tap 120 is connected to ground, SCR 114 will commence to conduct at the very instant that the ramp voltage signal begins to build and that SCR 34 will be turned on during the period of that particular ramp voltage signal. On the other hand, if the potential of the setting of tap 120 of the potentiometer is such that the voltage appearing at tap 120 is equal to or in excess of the maximum voltage to which the tamp voltage signal 120 builds, SCR 114 will not be turned on during the period of the ramp voltage signal, the SCR 34 will not be turned on, and full power will be applied to the load. The signal appearing at the anode of SCR 114 will be as shown in curve E of FIG. 2. If the signal shown in curve E from the anode of SCR 114 were applied to the control electrode of SCR 34 rather than the control electrode of SCR 150, the SCR 150 and its associated components could be eliminated, but power would be applied to the load when the ramp potential exceeds the reference voltage level. It has been found desirable to utilize the SCR 150 as the ramp potential is much more linear during the time interval when the capacitor is beginning to charge than when the capacitor is charged to a potential near that of the charging voltage.

From the foregoing, it can be seen that, for any selected number of cycles of supply voltage, determined by the period of ramp voltage, the number of cycles of supply voltage supplied to the load is determined by the setting of potentiometer 122. The setting of the potentiometer 122 can be accomplished manually or by a suitable sensor, such as a thermostat, if the device is to be used, for example, for control of heat.

From the foregoing, it can be seen that the present invention provides control of average power applied to high power loads without the necessity of using radiofrequency, interference suppression networks. Further, the average power applied to a load is controlled in accordance with a varying resistance which can be an integral portion of an external sensor. The control is especially adapted for control of heating elements, but can also be used for controlling the power applied to other loads in which only the average power applied to the load is important and the absence of power for several cycles of supply voltage is not detrimental.

It will be appreciated that many modifications can be made to the preferred embodiment of the invention described above. For example, other types of relaxation oscillators, such as those using unijunction transistors, can be use. The proportional signal applied to control SCR 34 can be generated by a differential amplifier. Also, the proportional signal, when generated, can be used to control directly an auxiliary SCR, such as SCR 38, which would then control the power device. The foregoing description, therefore, is intended to be illustrative and not limiting of the invention.

I claim:

1. A power control circuit for controlling the average power applied to a load comprising:
   a. switching means having two power terminals, said device normally exhibiting a high impedance between said two power terminals, but capable of being excited to a quasistable low-impedance state when a control signal is applied thereto and remaining in the low-impedance state so long as holding current flows through said power terminals or said control signal is applied to said switching means;
   b. means for connecting said switching means by said two power terminals in series with source of alternating current supply voltage and a load;
   c. zero crossing means for generating and applying to said switching means a control signal to cause said switching means to switch to said quasistable low-impedance state at the beginning of each half-cycle of applied alternating current supply voltage;
   d. generating means for generating a proportional control signal having a period substantially equal to that of a selected plurality of cycles of the alternating current supply voltage and whose character varies in accordance with the power requirements of the load;
   e. said generating means including means for generating a first voltage whose amplitude varies with time and having a period substantially equal to that of the selected plurality of cycles of alternating current supply voltage, means for generating a reference voltage whose amplitude varies as a function of the power requirement of the load, and comparison means responsive to one of the reference voltage and the ramp voltage being greater than the other for changing the character of the proportional control signal; and,
   f. means responsive to the character of the proportional control signal for selectively enabling and disabling said zero crossing means.

2. A power control circuit as defined in claim 1 wherein the comparison means produces a proportional control signal which is of binary character.

3. A power control circuit as defined in claim 1 wherein said means for generating a first voltage comprises a pulse generator, a capacitor, means for charging said capacitor, and means for discharging the capacitor each cycle of the pulse generator to provide a ramp voltage.

4. A power control circuit as defined in claim 3 wherein said pulse generator is a relaxation oscillator comprising a second capacitor, means for charging said second capacitor to a predetermined level during the plurality of cycles of alternating current supply voltage, a silicon controlled rectifier having an anode and a cathode connected in circuit with said second capacitor for discharging said second capacitor when the silicon controlled rectifier switches to the low-impedance state, and an avalanche diode device connected between the anode and a gate electrode of the silicon controlled rectifier for switching the silicon controlled rectifier from a normally high-impedance state to a low-impedance state when the avalanche diode switches to a low-impedance state from a normally high-impedance state upon the potential applied across the diode becoming equal to its avalanche voltage, said avalanche voltage being substantially equal to said predetermined level.

5. A power control circuit as defined in claim 3 wherein said means for discharging the capacitor includes a silicon controlled rectifier operated in a sublatching mode, means connecting said silicon controlled rectifier for discharging said capacitor, and means for switching said silicon controlled rectifier to the low-impedance state each cycle of the pulse generator.

6. A power control circuit as defined in claim 1 wherein said comparison means comprises a silicon controlled rectifier connected for operation in a sublatching mode, means for applying said reference voltage to the cathode of said silicon controlled rectifier and means for applying said first voltage to the gate electrode of said silicon controlled rectifier, the anode of said silicon controlled rectifier being connected to source of supply voltage whereby said silicon controlled rectifier is rendered conductive responsive to the first voltage being more positive than said reference voltage.

7. A power control circuit as defined in claim 1 wherein said zero crossing means is effective for generating said control signal prior to the beginning of each half-cycle of alternating current supply voltage in which power is to be applied to the load.

8. A power control circuit as defined in claim 1 wherein said zero crossing circuit is effective for generating and applying to said switching means a control signal from a time prior to the beginning of each half-cycle in which power is to be applied to the load until substantially the end of said half-cycle.

9. A power control circuit as defined in claim 1 wherein said switching means comprises two oppositely poled silicon controlled rectifiers.

10. A power control circuit as defined in claim 1 wherein said switching means is a bilateral semiconductor switch.

11. A power control circuit as defined in claim 1 wherein said comparison means further includes DC restoration means.

12. A power control circuit as defined in claim 1 wherein said means for selectively enabling and disabling said zero crossing circuit comprises a silicon controlled rectifier effective when in the conductive state to prevent said control signal being applied to said switching means.

13. A power control circuit as defined in claim 1 wherein the plurality of cycles is 50 cycles.

14. A power control circuit for controlling the average power applied to a load comprising:
   a. switching means having two power terminals, said device normally exhibiting a high impedance between said two power terminals, but capable of being excited to a quasistable low-impedance state when a control signal is applied thereto and remaining in the low-impedance state so long as holding current flows through said power terminals or said control signal is applied to said switching means;
   b. means for connecting said switching means by said two power terminals in series with a source of alternating current supply voltage and a load;
   c. zero crossing means for generating and applying to said switching means a control signal to cause said switching means to switch to said quasistable low-impedance state at the beginning of each half-cycle of applied alternating current supply voltage;
   d. means for generating a proportional control signal having a period substantially equal to that of a plurality of cycles of the alternating current supply voltage and whose character varies in accordance with the power requirements of the load;
   e. means responsive to the character of the proportional control signal for selectively enabling and disabling said zero crossing means; and,
   f. said means responsive to the character of the proportional control signal for selectively enabling and disabling said zero crossing means including a silicon controlled rectifier, means connecting said silicon controlled rectifier for disabling said zero crossing means when said silicon controlled rectifier is in one conductivity state and means for applying the proportional control signal for controlling the conductivity state of the silicon controlled rectifier in accordance with the character of the proportional control signal.

15. A power control circuit for controlling the average power applied to a load comprising:
   a. switching means having two power terminals, said device normally exhibiting a high impedance between said two power terminals, but capable of being excited to a quasistable low-impedance state when a control signal is applied thereto and remaining in the low-impedance state so long as holding current flows through said power terminals or said control signal is applied to said switching means;
   b. means for connecting said switching means by said two power terminals in series with a source of alternating current supply voltage and a load;
   c. a first capacitor;
   d. means for charging said first capacitor during one half-cycle of each cycle of applied alternating current supply voltage;
   e. means for preventing discharge of said capacitor except through control means connected to apply a control signal to said switching means whereby a control signal will be applied to said switching means of a character to cause said switching means to switch to the low-impedance state during another half-cycle immediately following the one half-cycle prior to the beginning of the other half-cycle;
   f. generating means for generating a proportional control signal having a period substantially equal to that of a selected plurality of cycles of the alternating current supply voltage and whose character varies in accordance with the power requirements of the load; and g. means responsive to the character of the proportional control signal for selectively enabling and disabling said control means.

16. A power control circuit as defined in claim 15 wherein said means for preventing discharge of said capacitor comprises a plurality of diode rectifier devices.

17. A power control circuit as defined in claim 15 wherein said zero crossing means further includes a second capacitor, means connecting said second capacitor to be charged during a one half-cycle responsive to conduction of said switching means during the preceding other half-cycle and means connecting said second capacitor for being discharged to apply a control signal to said switching means from the time prior to beginning of the one half-cycle to cause the switching means to switch to the low-impedance state at the beginning of the one half-cycle.

18. A power control circuit as defined in claim 17 wherein said zero crossing means further includes a second switching means connected for controlling the application of a control signal to the first-mentioned switching means.

19. A power control circuit as defined in claim 15 further including means for slaving said switching means for conduction during a one half-cycle immediately following another half-cycle in which the switching means is rendered conductive.